United States Patent [19]

Raineri

[11] 4,368,806

[45] Jan. 18, 1983

[54] CASTOR WHEEL SUPPORT ASSEMBLY FOR AN AGRICULTURAL MACHINE

[75] Inventor: Giuseppe Raineri, Bassano del Grappa, Italy

[73] Assignee: Pietro Laverda S.p.A., Breganze, Italy

[21] Appl. No.: 201,114

[22] Filed: Oct. 28, 1980

[30] Foreign Application Priority Data

Nov. 9, 1979 [IT] Italy .............................. 53725/79[U]

[51] Int. Cl.³ ............................................ F16D 65/14
[52] U.S. Cl. .................................... 188/2 R; 172/386
[58] Field of Search ............. 16/35 R, 35 D; 172/386; 188/1.12, 2 R, 31, 69, 82.3, 82.34

[56] References Cited

U.S. PATENT DOCUMENTS 2,192,282  3/1940  Warner ............................ 172/386 X
3,701,385 10/1972  Patterson et al. ................... 172/386

FOREIGN PATENT DOCUMENTS 1251991 10/1967 Fed. Rep. of Germany ...... 172/386

*Primary Examiner*—Duane A. Reger
*Attorney, Agent, or Firm*—Sughrue, Mion, Zinn, Macpeak & Seas

[57] ABSTRACT

A support assembly is provided for a castor wheel of an agricultural machine. This support assembly includes an arm rigid with the chassis of the machine and a wheel support member which is supported by the arm for rotation about a vertical axis. In order to facilitate steering of the machine when traversing across the line of maximum gradient on sloping ground, the wheel support assembly is provided with remotely controllable locking means for preventing rotation of the wheel support member, and thus of the castor wheel, about the said vertical axis. The locking means can take the form of a disk fast for rotation with the wheel support member and provided with a notch in its periphery, and a roller displaceable between a working position in which it engages in the notch to lock the wheel support member against rotation, and a rest position in which the roller is out of engagement with the disk.

5 Claims, 7 Drawing Figures

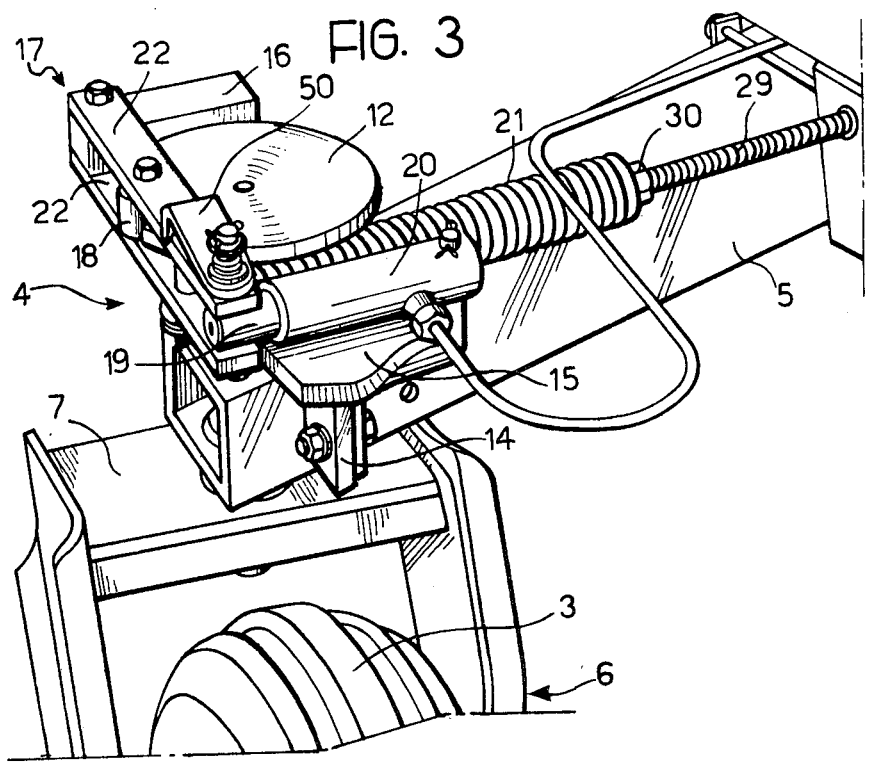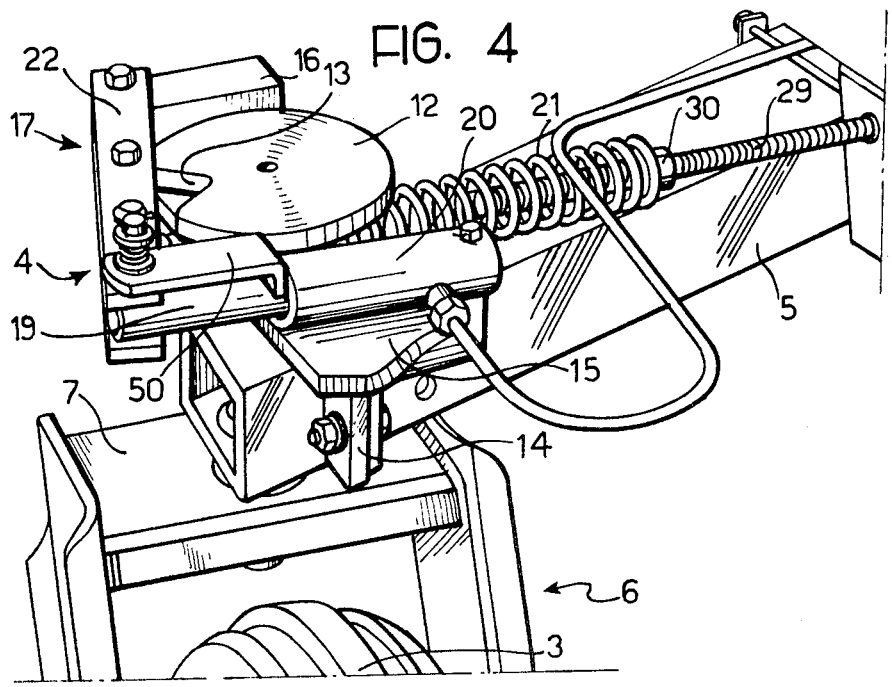

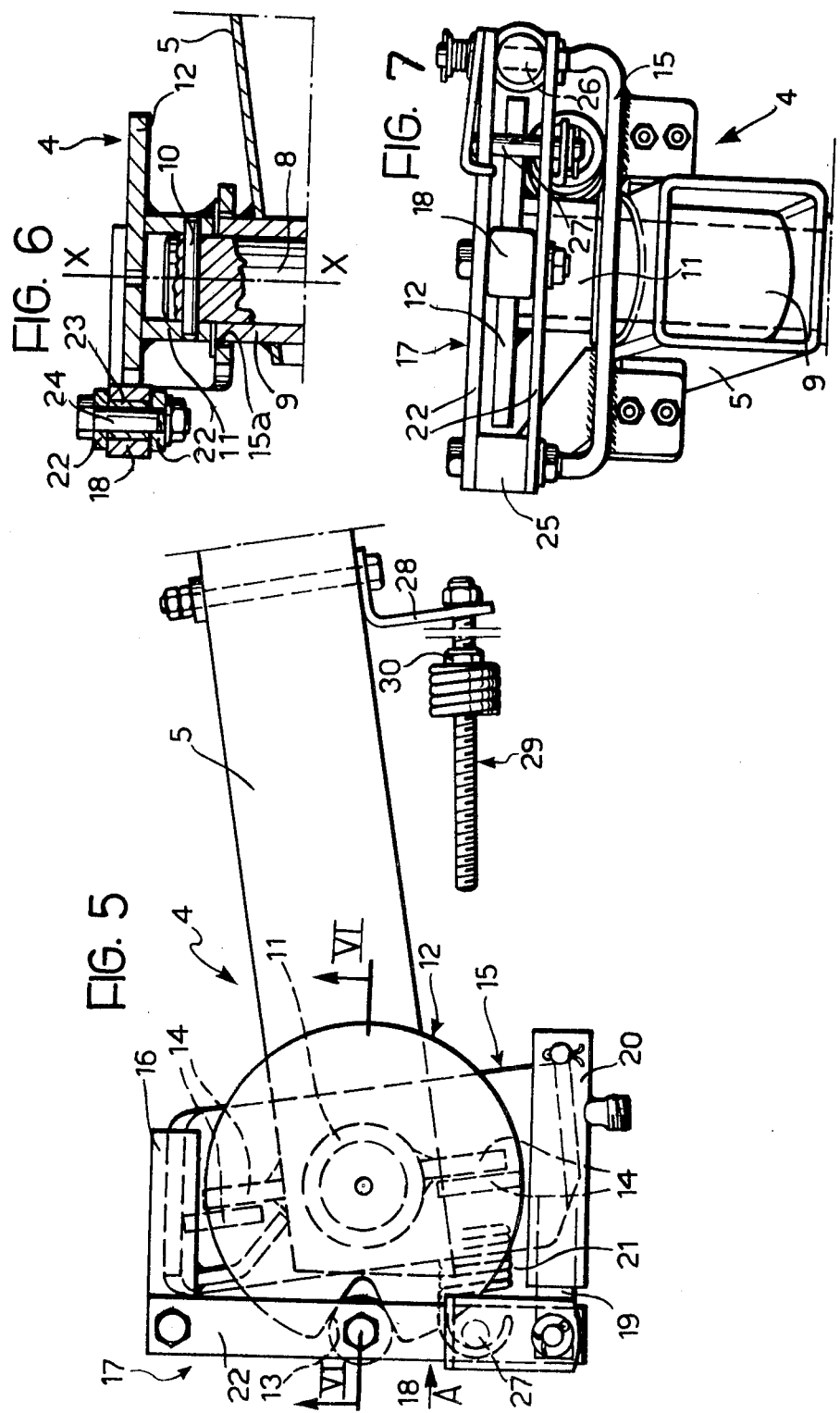

CASTOR WHEEL SUPPORT ASSEMBLY FOR AN AGRICULTURAL MACHINE

The present invention relates to a support assembly for a castor wheel of an agricultural machine, of the type comprising an arm fixed to the chassis of the agricultural machine, and a wheel support member which, in turn, is supported by said arm for rotation about a vertical axis.

Some types of agricultural machines, and in particular self-propelled windrowers, are provided with two driving wheels and with one or more castor wheels. In machines of this type, the two driving wheels are operated independently of each other, so as to achieve considerable steering manoeuvrability. In fact, due to the presence of the castor wheels, when for example the two driving wheels are being driven so as to rotate with equal speeds and in opposite directions, the agricultural machine turns about the central point of the axle supporting the driving wheels.

The operation of agricultural machines of the type described above does not present any difficulty where the ground is level or has a slight gradient. However, when these machines are to be used on ground with an appreciable gradient and in a direction not coinciding with that of the maximum gradient, the problem arises of preventing the rear part of the machine, supported by the castor wheels, from skidding downwards and necessitating continual steering adjustments.

In order to resolve this problem, the present invention provides an assembly for the support of a castor wheel of an agricultural machine, comprising an arm fixed to the chassis of the agricultural machine and a wheel support member which, in turn, is supported by said arm for rotation about a vertical axis, characterised in that the said support assembly further comprises remotely controllable locking means arranged to prevent rotation of the support member of the wheel about the said vertical axis.

Due to this characteristic, when the agricultural machine is to be used on sloping ground, the driver can lock the castor wheels of the machine so that the machine is able to maintain its heading without difficulty.

According to a further characteristic of the present invention, the said means for locking the castor wheel comprise:

a disk element fast for rotation with the support member of the wheel and provided with at least one notch in its periphery,
 a restraint element carried by the said arm and displaceable between a rest position and a working position in which the said restraint element is engaged in the said notch so as to prevent rotation of the disk element, and thus also of the support member of the wheel, about the said vertical axis,
 resilient means urging the restraint element into its working position, and
 means for controlling the displacement of the restraint element between its working position and its rest position.

A further characteristic of the support assembly according to the present invention lies in that it further comprises a support element fixed to the said arm and a support lever articulated at one end on the said support element about a vertical axis, the said restraint element comprising a vertical-axis roller carried by the support lever, and the said control means being arranged to control rotation of the support lever about its point of articulation, so as to cause displacement of the said roller between its rest position and its working position.

The said means for controlling the displacement of the lever supporting the roller can comprise, for example, a hydraulic jack carried by the said support element and having a shaft which is connected to the end of the roller support lever opposite the end of the lever articulated on the support element.

Further characteristics and advantages of the present invention will become apparent from the following description, made with reference to the appended drawings, which are supplied purely by way of non-limitative example, in which:

FIGS. 3,4 are two perspective views of a support assembly according to the present invention which show a restraint member in its working position and in its rest position respectively, FIG. 5 is a plan view corresponding to FIG. 3, FIG. 6 is a section taken on line VI—VI of FIG. 5, and FIG. 7 is an elevational view of the support assembly according to the arrow A of FIG. 5.

Figure 2:
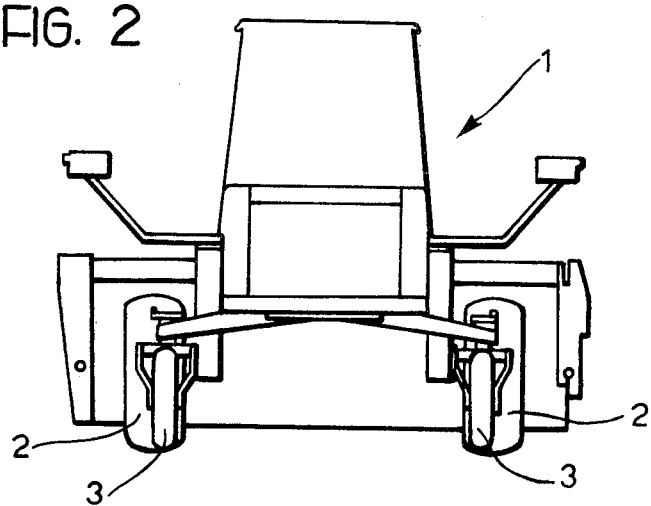
FIGS. 1, 2 are a plan view and a rear view respectively of an agricultural machine employing two support assemblies according to the present invention.
Figure 1:
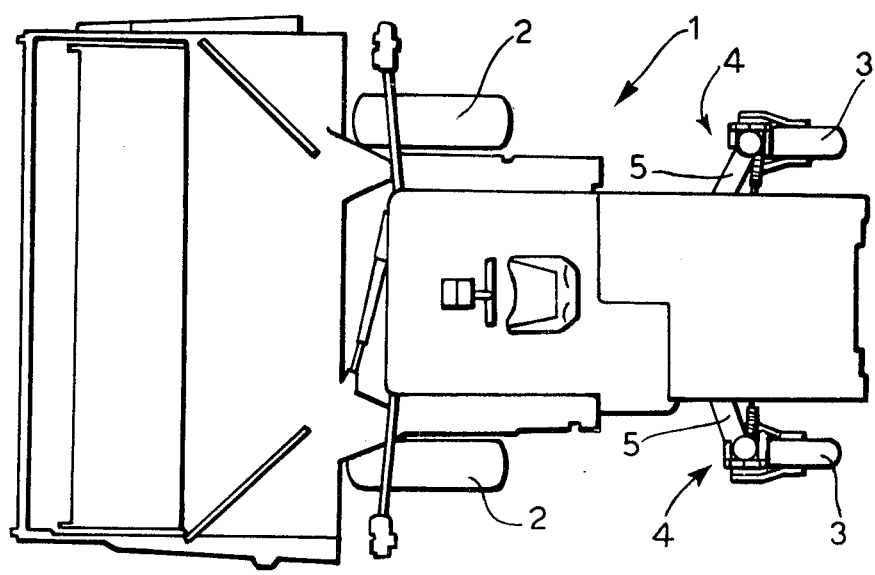

FIGS. 1 and 2 show a motor-mower 1 comprising two front driving wheels 2 and two rear castor wheels 3. Each castor wheel 3 is supported by a support assembly which is indicated in its entirety by reference numeral 4. Each support assembly 4 comprises an arm 5 secured to the chassis of the machine 1 and a support member 6 arranged to support the castor wheel 3 for rotation about its axis. The support member 6 comprises a forked element 7 carrying the wheel 3 and a guide pin 8 (see FIG. 6) which is supported for rotation about a vertical axis X—X, within a bush 9 welded onto the arm 5. The upper end of the guide pin 8 projects from the bush 9 and is secured by means of a transverse pin 10 to a tubular appendage 11 welded onto the lower face of a disk element 12. This disk element has a V-shaped notch 13 in its periphery.

A plate 15 is secured to the arm 5 by means of brackets 14. The plate 15 has a hole 15a which surrounds the bush 9. At one end of the plate 15, which is of substantially elongate rectangular shape, there is fixed an element 16 to which is articulated one end of a lever 17. The lever 17 supports a vertical axis roller 18 which is arranged to engage in the notch 13 so as to prevent rotation of the disk element 12, and thus also of the support member 6, about the vertical axis X—X. The opposite end of the lever 17 which supports the roller 18 is connected to the shaft 19 of an hydraulic jack 20 which can be actuated by the driver of the agricultural machine. The support lever 17 is also connected to the arm 5 by means of a helical spring 21 which urges the lever 17 to rotate in an anti-clockwise sense (with regard to FIG. 5) about its point of articulation to the element 16.

The lever 17 comprises two flat plates 22 of elongate rectangular shape arranged parallel with and spaced from each other. The roller 18 is mounted, with the interposition of a bush 23, on a pin 24 which is located between the plates 22. The roller 18 can be displaced between a working position (shown in FIGS. 3 and 5), in which it is engaged within the notch 13 of the disk element 12, and a rest position (shown in FIG. 4) in which the roller 18 is spaced from the disk element 12 as a result of which this disk element is free to rotate about its axis. The two positions correspond to the retracted condition and to the extended condition respectively of the hydraulic jack 20. When the roller 18 is situated in its working position, the helical spring 21 tends to keep it in engagement with the walls of the notch 13.

The element 16 is provided with a tubular element 25 within which a guide pin (not shown) is rotatably supported. This guide pin is interposed between the two plates 22 at one end of the lever 17. The connection between the shaft 19 of the jack 20 and the lever 17 is also made by means of a pin 26 interposed between the plates 22. Finally, a connecting pin indicated by reference 27 is interposed between the plates 22 and serves to connect one end of the helical spring 21 to the lever 17. The opposite end of the spring 21 is connected to a support 28, integral with the arm 5, by the interposition of a threaded tie rod 29 which engages a nut 30 connected to the spring. In this manner, it is possible to control the loading of the helical spring 21 urging the roller 18 into the notch 13 of the disk element 12.

When sharp turns are being made or when the agricultural machine is being used on level ground or ground with a slight gradient, the hydraulic jack 20 is extended to cause the lever 17 to rotate about its point of articulation in an anti-clockwise sense (with regard to FIG. 5), against the action of the helical spring 21. In this manner, the roller 18 is held in its rest position shown in FIG. 4. The disk element 12 and the support member 6 of the wheel are therefore free to rotate about the vertical axis X—X. A plate 50 may be used as a safety element to lock the shaft of the jack in its extended position when the device is not required to be used.

However, in the case where it is desired to operate on ground with an appreciable gradient while keeping the direction of movement constant, it is sufficient to allow the hydraulic jack to contract until it supports the roller 18 in the notch 13. The helical spring 21 keeps the roller 18 pressed against the walls of the notch 13 so as to prevent any rotation of the disk element 12 about its axis. The support member 6 of the castor wheel 3 is therefore locked, as a result of which the agricultural machine is able to maintain its heading without difficulty. The V-shape of the edges of the notch 13 enables the wheel to unlock automatically when it is stressed with a load which is sufficient to overcome the reaction force of the spring.

I claim:

1. In an agricultural machine having a chassis and at least one castor wheel supporting said chassis, an assembly for the support of said castor wheel comprising:

an arm fixed to the chassis of the agricultural machine, a wheel support member rotatably mounting said castor wheel for rotation about its axis, said support member being, in turn, supported said arm for rotation about a vertical axis, and remotely controllable locking means for preventing rotation of said wheel support member about the said vertical axis, said locking means comprising:

a disk element fast for rotation with the wheel support member and formed to define at least one notch in its periphery, a restraint element carried by the said arm and displaceable between a rest position and a working position in which the said restraint element is engaged in the said notch so as to prevent rotation of the disk element, and thus also of the wheel support member, about the said vertical axis, resilient means urging said restraint element into its working position, means for controlling the displacement of the restraint element between its working position and its rest position, a support element fixed to the said arm, and a support lever articulated at one end on the said support element about a vertical axis, the said restraint element comprising a vertical-axis roller carried by the support lever, and the said control means being arranged to control rotation of the support lever about its point of articulation, so as to cause displacement of the said roller between its rest position and its working position.

2. The support assembly of claim 1, wherein said resilient means are interposed between the arm and the support lever of the roller.

3. The support assembly of claim 1, wherein the said control means comprise an hydraulic jack carried by the said support element and having a shaft which is connected to the end of the support lever opposite the said end articulated on the support element.

4. The support assembly of claim 2, wherein the said resilient means comprise a helical spring having one end connected to the support lever of the roller and its opposite end connected to the arm via a threaded coupling by means of which the loading of the helical spring can be adjusted.

5. The support assembly of claim 4, wherein the support lever of the roller comprises two flat plates of elongate shape arranged parallel with and spaced from each other, said roller being supported by an arrangement including a mounting pin interposed perpendicularly between the said plates, and a bush interposed between said roller and its mounting pin.

* * * * *